United States Patent
Li et al.

(10) Patent No.: US 11,055,272 B2
(45) Date of Patent: Jul. 6, 2021

(54) DATA PROCESSING METHOD AND APPARATUS

(71) Applicant: Alibaba Group Holding Limited, Grand Cayman (KY)

(72) Inventors: Zhuoling Li, Zhejiang (CN); Qi Xiong, Zhejiang (CN); Sen Han, Zhejiang (CN); Julei Li, Zhejiang (CN)

( * ) Notice: Subject to any disclaimer, the term of this patent is extended or adjusted under 35 U.S.C. 154(b) by 188 days.

(21) Appl. No.: 16/015,100

(22) Filed: Jun. 21, 2018

(65) Prior Publication Data

US 2018/0300365 A1    Oct. 18, 2018

Related U.S. Application Data

(63) Continuation of application No. PCT/CN2016/109413, filed on Dec. 12, 2016.

(51) Int. Cl.
  *G06F 11/34*     (2006.01)
  *H04L 29/08*     (2006.01)
  (Continued)

(52) U.S. Cl.
  CPC ...... *G06F 16/2322* (2019.01); *G06F 11/3409* (2013.01); *G06F 16/2477* (2019.01);
  (Continued)

(58) Field of Classification Search
  None
  See application file for complete search history.

(56) References Cited

U.S. PATENT DOCUMENTS

2012/0136914 A1\* 5/2012 Imanishi ............... G11B 27/10
                                                           709/201
2012/0166417 A1   6/2012 Chandramouli et al.
(Continued)

FOREIGN PATENT DOCUMENTS

CA        105070054 A    11/2015
CN        101350031 A     1/2009
(Continued)

OTHER PUBLICATIONS

Translation of CN Office Action from Corresponding CN Application No. 201510971758.4 dated Aug. 26, 2019, a counterpart foreign application for U.S. Appl. No. 16/015,100 , 5 pages.
(Continued)

*Primary Examiner* — Robert W Beausoliel, Jr.
*Assistant Examiner* — Cheryl M Shechtman
(74) *Attorney, Agent, or Firm* — Lee & Hayes, P.C.

(57) ABSTRACT

A system time window corresponding to data to be processed is determined based on a data time of the data to be processed when the data to be processed is received in a current system time window. If the data time is within a range of the current system time window, data to be processed having a system receiving time earlier than the synchronization time point is stored, and data to be processed having a system receiving time later than the synchronization time point is immediately processed. If the data time is within a range of a previous system time window, data to be processed having a system receiving time earlier than the closing time point is immediately processed, and data to be processed having a system receiving time later than the closing time point is discarded.

20 Claims, 3 Drawing Sheets

(51) Int. Cl.
  *H04L 12/823* (2013.01)
  *G06F 16/2458* (2019.01)
  *G06F 16/23* (2019.01)

(52) U.S. Cl.
  CPC .......... *H04L 47/32* (2013.01); *H04L 67/1095* (2013.01); *H04L 67/2842* (2013.01); *G06F 2201/805* (2013.01); *G06F 2201/835* (2013.01)

(56) References Cited

U.S. PATENT DOCUMENTS

| | | | | |
|---|---|---|---|---|
| 2013/0346441 | A1* | 12/2013 | Imaki | G06Q 30/02 707/769 |
| 2015/0178327 | A1 | 6/2015 | Cohen et al. | |
| 2016/0125033 | A1* | 5/2016 | Kashiyama | G06F 16/2453 707/713 |

FOREIGN PATENT DOCUMENTS

| | | |
|---|---|---|
| CN | 102752669 A | 10/2012 |
| CN | 103544117 A | 1/2014 |
| CN | 103853766 A | 6/2014 |
| CN | 104202122 A | 12/2014 |
| CN | 104317958 A | 1/2015 |
| CN | 103297529 A | 9/2019 |

OTHER PUBLICATIONS

Translation of CN Search Report from Corresponding CN Application No. 201510971758.4 dated Aug. 15, 2019, a counterpart foreign application for U.S. Appl. No. 16/015,100 , 2 pages.
Abadi et al, "Aurora: A New Model and Architecture for Data Stream Management", VLDB Journal, vol. 12, No. 2, Springer Verlag, Berlin, DE, Aug. 1, 2003, pp. 120-139.
Akidau et al, "MillWheel", Proceedings of the VLDB Endowment, vol. 6, No. 11, Aug. 27, 2013, pp. 1033-1044.
Ali et al, "The Extensibility Framework in Microsoft StreamInsight", Data Engineering (ICDE), 2011 IEEE 27th International Conference, IEEE, Apr. 11, 2011, pp. 1242-1253.
The Extended European Search Report dated Apr. 25, 2019 for European Patent Application No. 16877604.5, 10 pages.
Fegaras et al, "Exploiting Punctuation Semantics in Continuous Data Streams", IEEE Transactions on Knowledge and Data Engineering, vol. 15, No. 3, IEEE Service Center, Los Alamitos, CA, pp. 555-568.
Translation of International Search Report dated Feb. 24, 2017, from correpsonding Chinese PCT Application No. PCT/CN2016/109413, 2 pages.
Srivastava et al, "Flexible Time Management in Data Stream Systems", Principles of Database Systems, ACM, New York, New York, Jun. 14, 2004, pp. 263-274.
Translation of Chinese Written Opinion dated Feb. 24, 2017, from corresponding Chinese PCT Application No. PCT/CN2016/109413, 5 pages.

\* cited by examiner

DATA PROCESSING METHOD AND APPARATUS

CROSS REFERENCE TO RELATED PATENT APPLICATIONS

This application claims priority to and is a continuation of PCT Patent Application No. PCT/CN2016/109413 filed on 12 Dec. 2016, and is related to and claims priority to Chinese Patent Application No. 201509717584, filed on 22 Dec. 2015, entitled "Data Processing Method and Apparatus," which are hereby incorporated by reference in their entirety.

TECHNICAL FIELD

The present disclosure relates to the technical field of communications, and particularly to data processing methods and apparatuses.

BACKGROUND

As a new data processing method, stream computing can perform real-time computation for dynamically generated data and return a result in time. Currently, stream computing has become popularly used in fields such as financial banking applications, Internet applications, and Internet of Things applications, and are mainly used for conducting statistics on data within a defined time interval, i.e., conducting statistics on data in a predefined time window.

In existing technologies, stream computing has two types of time windows, "system time window" and a "data time window", with respective features and disadvantages being given as follows.

(1) System Time Window

In a system time window, statistics are performed on data of a data generation end based on system times. Statistical times of the data are first divided into a plurality of system time windows based on a predefined time interval, and statistical results of the system time windows are then outputted. A certain latency exists for data from the generation end to a statistics end if only processing is performed on the data according to a system time window. Data that is processed within a system time window is usually not the same as data that is generated by the generation end within the predefined time interval in a real process, thus affecting a result of stream computing.

(2) Data Time Window

In a data time window, statistics are performed on data of a data generation end based on data times. In a real statistical process, due to a failure of complete synchronization of time clocks of devices of data generation ends and an influence of the speed of a data collection and transmission process, data times at which a statistics end receives data may not strictly follow to a sequential order of data times. Therefore, a problem of data disorder may occur in statistical results that are based on data time windows. In a real statistical process, a situation in which some data at a border of a current data time window crosses into another data time windows occurs very easily, thereby affecting stream computing results.

Once a situation of data disorder occurs, the accuracy of the stream computing can be guaranteed only if all the data of a current time window is guaranteed to be reached to a statistical end. Therefore, in an existing real statistical process, a current data time window is closed only when a data time of data received by a statistical end exceeds the data time window and a predefined value is reached, or when data of a next data time window received by the statistical end reaches a predefined value.

In a process of implementing the present disclosure, inventors note the following problems existing in existing technologies:

(1) Data of stream computing is usually unstable. When an amount of data of a statistical item is relatively small, data of a next data time window still does not reach a statistical end, and a statistical result of a current data time window is not outputted in time, a delay in data statistics is resulted, and a result of the stream computing is thus affected.

(2) Computing units of stream computing at a same level are generally many and concurrent. When statistical results of the computing units of the same level are needed to be outputted in an order, a situation in which data times of data of different computing units are not synchronized occurs, causing a result of the stream computing to be affected.

As can be seen, when the existing technologies conduct data statistics in real time for stream computing, statistical data cannot be outputted in time while the data statistics is guaranteed to be complete, and the statistical data cannot be globally synchronized at the same time, thus affecting the accuracy of data processing results.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides a data processing method to solve the problem of failing to ensure the completeness of statistical data and real-time processing of the statistical data at the same time by preset a closing time point and a synchronization time point for each system time window of a data statistical system.

The method is applied in a data statistical system. Each system time window of the data statistical system is configured with a closing time point and a synchronization time point in advance. The closing time point is earlier than the synchronization time point, and is later than a starting time point of the respective system time window. The method includes determining a system time window corresponding to data to be processed based on a data time of the data to be processed when the data to be processed is received in a current system time window; storing data to be processed having a system receiving time earlier than the synchronization time point, and immediately processing data to be processed having a system receiving time later than the synchronization time point, if the data time is within a range of the current system time window; and immediately processing data to be processed having a system receiving time earlier than the closing time point, and discarding data to be processed having a system receiving time later than the closing time point, if the data time is within a range of a previous system time window.

In implementations, determining the system time window corresponding to the data to be processed based on the data time of the data to be processed includes obtaining the data time of the data to be processed based on a timestamp of the data to be processed in a data time window; determining whether the data time is later than a starting time point of the current system time window; determining that the data to be processed falls within the range of the current system time window if affirmative; and determining that the data to be processed falls within the range of the previous system time window if not.

In implementations, the method further includes outputting processing results of the data to be processed with respective data times falling within the range of the previous system time window, and closing a data time window corresponding to the previous system time window, when a system time of the data statistical system reaches the closing time point.

In implementations, the method further includes processing data to be processed that is stored before the synchronization time point and data times thereof are within the range of the current system time window, and outputting processing results thereof, when a system time of the data statistical system reaches the synchronization time point.

In implementations, the closing time point is set based on a time difference between the system time and the data time, and the synchronization time point is set based on time consumed for closing the time window and a difference between time clocks of the devices in the data statistical system.

Correspondingly, the present disclosure further provides a data processing apparatus. The apparatus is used in a data statistical system. Each system time window of the data statistical system is configured with a closing time point and a synchronization time point in advance. The closing time point is earlier than the synchronization time point, and is later than a starting time point of the respective system time window. The apparatus includes a determination module used for determining a system time window corresponding to data to be processed based on a data time of the data to be processed when the data to be processed is received in a current system time window; a first processing module used for storing data to be processed having a system receiving time earlier than the synchronization time point, and immediately processing data to be processed having a system receiving time later than the synchronization time point, if the data time is within a range of the current system time window; and a second processing module used for immediately processing data to be processed having a system receiving time earlier than the closing time point, and discarding data to be processed having a system receiving time later than the closing time point, if the data time is within a range of a previous system time window.

In implementations, the determination module is used for obtaining the data time of the data to be processed based on a timestamp of the data to be processed in a data time window; determining whether the data time is later than a starting time point of the current system time window; determining that the data to be processed falls within the range of the current system time window if affirmative; and determining that the data to be processed falls within the range of the previous system time window if not.

In implementations, the apparatus further includes a first output module used for outputting processing results of the data to be processed with respective data times falling within the range of the previous system time window, and closing a data time window corresponding to the previous system time window, when a system time of the data statistical system reaches the closing time point.

In implementations, the apparatus further includes a second output module used for processing data to be processed that is stored before the synchronization time point and data times thereof are within the range of the current system time window, and outputting processing results thereof, when a system time of the data statistical system reaches the synchronization time point.

In implementations, the closing time point is set based on a time difference between the system time and the data time, and the synchronization time point is set based on time consumed for closing the time window and a difference between time clocks of the devices in the data statistical system.

As can be seen, by using technical solutions of the present disclosure, in a process of stream computing that needs to output computation results completely in real time, statistical data is globally synchronized by setting a closing time point and a synchronization time point for each system time window of a data statistical system in advance. This can ensure conducting data statistics in real time while ensuring the completeness thereof, and thus improve the accuracy and the timeliness of data processing results.

DETAILED DESCRIPTION

In view of the problems in the existing technologies, the present disclosure provides a data processing method, which sets closing time points and synchronization time points of various system time windows in advance, and performs processing and outputting of data to be processed in a piecewise manner by using the closing time points and the synchronization time points as nodes, thus effectively improving the accuracy and the timeliness of data processing results.

A closing time point is a time of closing a data time window corresponding to a previous system time window, and is also acting as a starting time of synchronization of a data time window corresponding to a current system time window. A synchronization time point is an ending time of synchronization of the data time window corresponding to the current time window. Therefore, closing time points and synchronization time points are used as nodes, demarcating a system time window into different processing and outputting stages, which can ensure the completeness of data processing while taking account of the timeliness of outputting processing results.

In an exemplary embodiment of the present disclosure, the closing time point is set based on a time difference between the system time and the data time. The synchronization time point is set based on time consumed for closing a time window and a difference between time clocks of devices in the data statistical system.

For example, a data statistical system needs to process all data that is generated by corresponding devices within a system time window of 0-1 min, which is assumed to correspond to all data having a timestamp of a data time window as 10:04. In a real statistical process, if the last piece of data of the timestamp as 10:04 can arrive at 1 min 10 s of a system time window of 1-2 min, 1 min 11 s is set to be a closing time point to ensure that all data to be processed that corresponds to the system time window of 0-1 min can completely arrive at the data statistical system. If a sum of time consumption of the system time window of 0-1 min and a time difference between the devices in the system is 2 s, 1 min 13 s is set to be a synchronization time point. Data to be processed that is received and corresponds to the system time window of 1-2 min is synchronized globally in this time segment.

Figure 1:
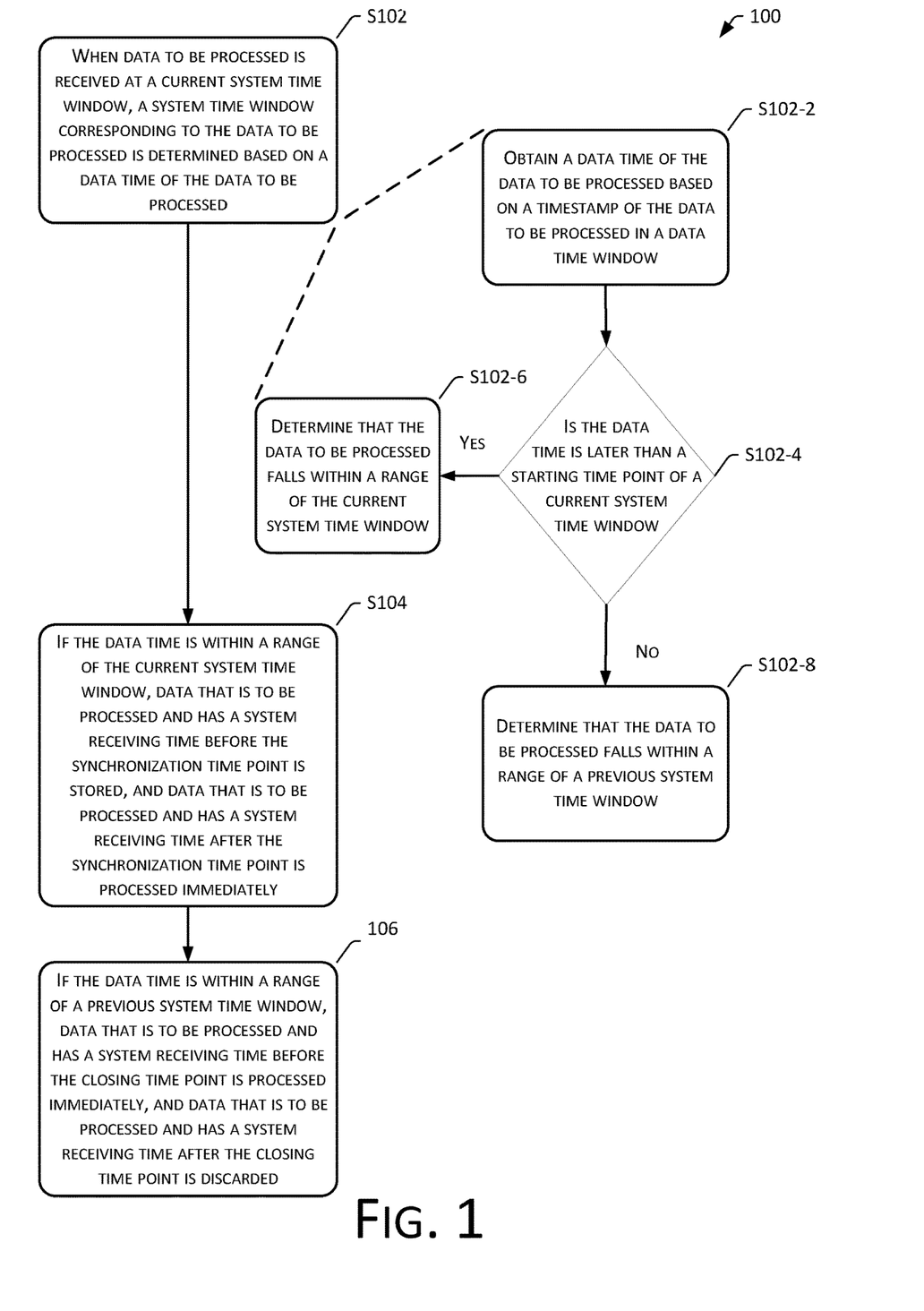
FIG. 1 is a flowchart of a data processing method provided by the present disclosure.

FIG. 1 shows a flowchart of a data processing method 100 provided by the present disclosure. The method 100 is applied in a data statistical system. Each system time window of the data statistical system is configured with a closing time point and a synchronization time point in advance. The closing time point is earlier than the synchronization time point, and is later than a starting time point of the respective system time window. In implementations, the method 100 may include the following operations.

S102: When data to be processed is received at a current system time window, a system time window corresponding to the data to be processed is determined based on a data time of the data to be processed.

In a real application scenario, due to influences of differences among time clocks of devices of a data generation end and speeds of data transmission processes, data times of different pieces of data to be processed that are received by the data statistical system may not strictly follow an ascending order of sequence of the data times. Therefore, a situation in which data that is to be processed in a previous system time window passes into a current system time window. In other words, some pieces of data to be processed that are received in the current system time window may be corresponding data to be processed in the previous system time window. This not only affects the completeness of data in the previous system time window, but also causes an interference to the processing of data in the current system time window.

For example, the data statistical system needs to process all data generated by corresponding devices within a system time window of 0-1 min, which is assumed to correspond to all data of a data time window with a timestamp of 10:04. In a real statistical process, some of the data with a timestamp of 10:04 can only arrive at a system time window of 1-2 min. This not only affect the completeness of data processing of the system time window of 0-1 min, but also causes an interference to data processing of the system time window of 1-2 min.

Therefore, in order to avoid a computation result from being affected by a disorder of data to be processed, in implementations, a determination of a system time window corresponding to data to be processed needs to be made based on a data time of the data to be processed when the data to be processed is received at a current system time window. Details of a process of determination are given as follows:

S102-2: Obtain a data time of the data to be processed based on a timestamp of the data to be processed in a data time window;

S102-4: Determine whether the data time is later than a starting time point of a current system time window;

S102-6: Determine that the data to be processed falls within a range of the current system time window if affirmative; and S102-8: Determine that the data to be processed falls within a range of a previous system time window if not.

It should be noted that a timestamp of data to be processed as described above is merely an example provided in an exemplary embodiment of the present disclosure. Based thereupon, other forms may be selected to represent a data time of data to be processed, to enable the present disclosure to be suitable for use in more application fields. All these changes belong to the scope of protection of the present disclosure.

S104: If the data time is within a range of the current system time window, data that is to be processed and has a system receiving time before the synchronization time point is stored, and data that is to be processed and has a system receiving time after the synchronization time point is processed immediately.

Specifically, if what is received is data to be processed that corresponds to the current system time window, the synchronization time point is used as a dividing point for separately processing of the data to be processed.

Before the synchronization time point, the data statistical system not only needs to process and output data to be processed having respective data times that are within the range of the current system time window, but also needs to globally synchronize the output data to be processed having the respective data times that are within the range of the current system time window. Taking into account of the statistical and computational efficiency and avoiding chaos in a statistical and computational process, only data that is to be processed and has a system receiving time that is earlier than the synchronization time point is therefore stored.

After the synchronization time point, since a data time window corresponding to a previous system time window has closed and global synchronization of data to be processed within the range of the current system time window has completed, data that is to be processed and has a system receiving time that is later than the synchronization time point is processed immediately.

S106: If the data time is within a range of a previous system time window, data that is to be processed and has a system receiving time before the closing time point is processed immediately, and data that is to be processed and has a system receiving time after the closing time point is discarded.

Specifically, if what is received is data to be processed corresponding to a previous system time window, the data to be processed is separately processed with the closing time point as a dividing point.

Before the closing time point, there may exist some data to be processed that corresponds to a previous system time window and arrives at the data statistical system only in the current system time window due to the influence of time clock differences in devices of a generation end and the speeds of data transmission processes. These pieces of data have an important role in ensuring the completeness and the accuracy of data processing of the previous system time window. Therefore, data that is to be processed and has the system receiving time before the closing time point is processed immediately.

After the closing time point, since a data time window corresponding to the previous system time window has closed, data to be processed that arrives at the data statistical system at this moment will affect global synchronization of data that is to be processed and has a data time within the range of the current system time window, and may even cause chaos in a statistical and computational process of the data that is to be processed and has the data time within the range of the current system time window. Therefore, the data that is to be processed and has time system receiving time after the closing time point is discarded.

In an embodiment of the present disclosure, the closing time point and the synchronization time point are separately used as output nodes of processing results.

Specifically, when a system time of the data statistical system reaches the closing time point, processing results of data that is to be processed and has respective data times within the range of the previous system time window are outputted, and the data time window corresponding to the previous system time window is closed.

In an embodiment of the present disclosure, when a system time of the data statistical system reaches the synchronization time point, data to be processed that is stored before the synchronization time point and has respective data times within the range of the current system time window is processed, and processing results thereof are outputted.

As can be seen, by using the technical solutions of the present disclosure, each system time window of a data statistical system is configured with a closing time point and a synchronization time point in advance. The closing time point and the synchronization time point are separately used as nodes, and data to be processed is processed and outputted by sections using the closing time point and the synchronization time points as the nodes. Furthermore, a global synchronization process of the data to be processed is added. Therefore, processing of data statistics is timely with a premise that the completeness thereof can be guaranteed, and thereby the accuracy and the timeliness of data processing results are improved.

Figure 2:
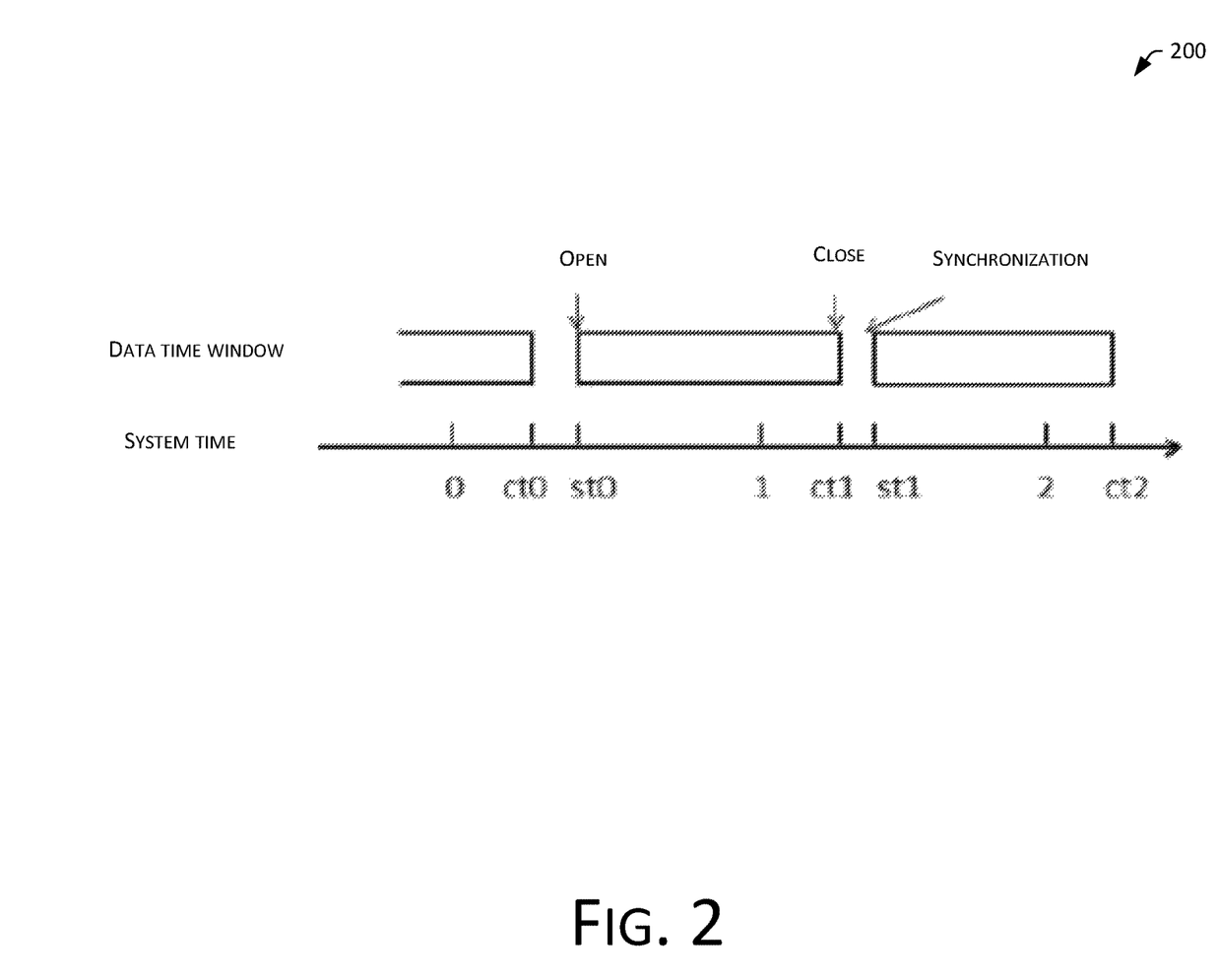
FIG. 2 is a flowchart of a data processing method provided by specific embodiments of the present disclosure.

In order to further explain technical concepts of the present disclosure, the technical solutions of the present disclosure are described in conjunction with an example application scenario 200 as shown in FIG. 2.

When statistics is conducted for data of stream computing, a situation in which some data passes from a boundary of a previous data time window to another data time window easily occurs due to a difference between a system time and a data time of the data, thereby causing a result of the stream computing be affected. Since a difference between a system time and a data time of data is usually not very large, some data at the boundary of a previous data time window generally only crosses over to an adjacent data time window (i.e., a data time window next thereto). Even if a small amount of data corresponding to a current data time window crosses over to a non-adjacent data time window (i.e., a data time window after a next data time window), this crossed-over data can be discarded when a data processing node of the corresponding data time window is reached. In stream computing, the likelihood of an occurrence of this situation is very low. Furthermore, even if this situation occurs, selecting to discard a very small amount of data will not affect a statistical processing result of data of the current data time window.

Accordingly, in the example application scenario 200, a data processing method is proposed for a process of stream computing that needs to output a computational result in real time and in a complete manner. In the method, a data time window is used as a time basis for data statistics, and a system time window is used as a basis for closure of the data time window and a global synchronization.

The method sets a closing time point and a synchronization time point for each system time window in advance. The closing time point is set based on a time difference between a system time and a data time, and the synchronization time point is set based on differences among time clocks of devices in the data statistical system.

Specifically, the present disclosure scenario 200 uses 0-1 as a previous system time window, and 1-2 as a current system time window. The previous system time window is configured with a closing time point ct0 and a synchronization time point st0 in advance, and the current system time window is configured with a closing time point ct1 and a synchronization time point st1 in advance.

First operation: At 1-ct1, the data statistical system receives pieces of data to be processed, and performs a determination based on respective data time of the pieces of data to be processed, stores a piece of data to be processed if a respective data time falls within a range of the current system time window of 1-2, and immediately processes and outputs the piece of data to be processed if the data time falls within a range of the previous system time window of 0-1.

Specifically, pieces of data to be processed that is received in this time segment may have piece(s) of data corresponding to the previous system time window of 0-1, and piece(s) of data corresponding to the current system time window of 1-2. If a piece of data to be processed corresponding to the previous system time window of 0-1, this piece of data is immediately processed and outputted. If a piece of data to be processed corresponds to the current system time window of 1-2, this piece of data is only stored and not processed.

Second operation: At time ct1, processing results of all pieces of data to be processed having respective data times falling within the range of the previous system time window of 0-1 are outputted, and a data time window corresponding to the previous system time window is closed.

Specifically, when the time ct1 is reached, data to be processed corresponding to the previous system time window of 0-1 is no longer stored.

Third operation: At ct1-st1, a piece of data to be processed is received. A determination is made based on a data time of the piece of data to be processed. If the data time is within the range of the current system time window of 1-2, the piece of data to be processed is stored, and stored data to be processed is synchronized globally. If the data time is within the range of the previous system time window of 0-1, the piece of data to be processed is discarded.

Specifically, data to be processed that are received in this time segment may have data corresponding to the previous system time window of 0-1, and data corresponding to the current system time window of 1-2. If a piece of data to be processed corresponding to the previous system time window of 0-1, the piece of data to be processes is discarded. If a piece of data to be processed corresponds to the current system time window of 1-2, the piece of data to be processed is stored for performing a global synchronization, and is not processed.

Fourth operation: A st1-2, data to be processed is received and processed, and processing results of data stored at 1-ct1 are outputted in real time.

Specifically, data to be processed that is received in this time segment has data corresponding to the current system time window of 1-2. Processing is performed on the received data to be processed and the data to be processed that is previously stored at the time segment of 1-st1 and has the data time falling within the range of the current system time window of 1-2. A processing result thereof is outputted in real time. In the technical solutions of the above specific application scenario, a global synchronization is performed for statistical data by setting a closing time point and synchronization time point for each system time window in advance in a process of stream computing that needs to output a computational result in real time and in a complete manner. This can perform data statistics in time with a premise that the completeness thereof is guaranteed, thus improving the accuracy and the timeliness of a data processing result.

It should be noted herein that the content of the above specific application scenario is merely an example of an exemplary embodiment of the present disclosure. More application fields may also be included based thereon, thus making the present technical solutions to have a more widespread application. All of these improvements belong to the scope of protection of the present disclosure.

Figure 3:
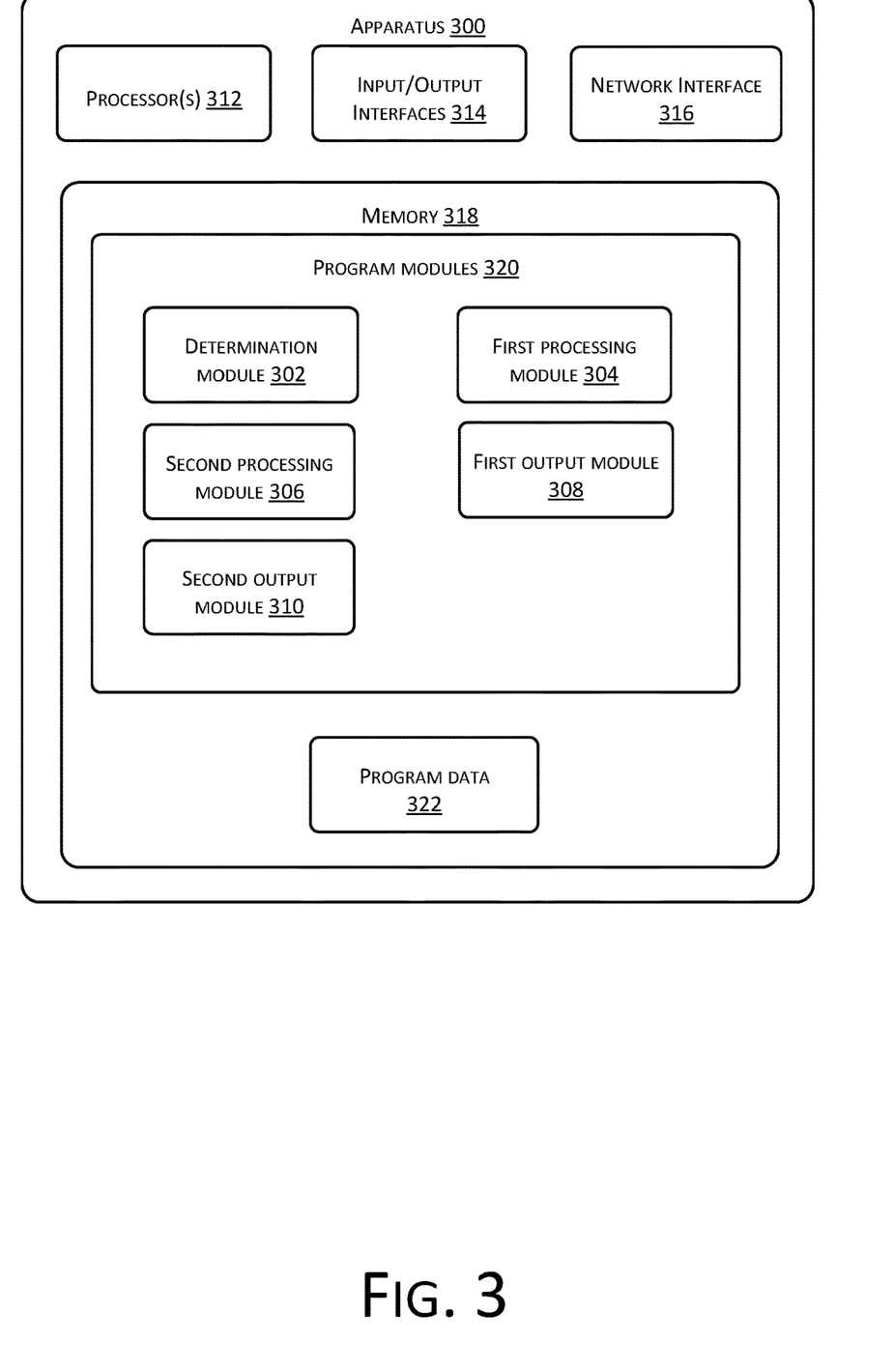
FIG. 3 is a schematic diagram of a data processing apparatus provided by the present disclosure.

In order to achieve the above technical goals, the present disclosure further provides a data processing apparatus 300 as shown in FIG. 3. In implementations, the apparatus 300 may include one or more computing devices. In implementations, the apparatus 300 may be a part of one or more computing devices which may be located in a single location, or distributed among a plurality of network devices through a network. In implementations, the apparatus 300 may be used in a data statistical system. Each system time window in the data statistical system is configured with a closing time point and a synchronization time point in advance. The closing time point of a same system time window is located before the synchronization time point and after a starting time point. In implementations, the apparatus 300 may include a determination module 302 used for determining a system time window corresponding to data to be processed based on a data time of the data to be processed when the data to be processed is received in a current system time window; a first processing module 304 used for storing data to be processed having a system receiving time earlier than the synchronization time point, and immediately processing data to be processed having a system receiving time later than the synchronization time point, if the data time is within a range of the current system time window; and a second processing module 306 used for immediately processing data to be processed having a system receiving time earlier than the closing time point, and discarding data to be processed having a system receiving time later than the closing time point, if the data time is within a range of a previous system time window.

In implementations, the determination module 302 is used for obtaining the data time of the data to be processed based on a timestamp of the data to be processed in a data time window; determining whether the data time is later than a starting time point of the current system time window; determining that the data to be processed falls within the range of the current system time window if affirmative; and determining that the data to be processed falls within the range of the previous system time window if not.

In implementations, the apparatus 300 may further include a first output module 308 used for outputting processing results of the data to be processed with respective data times falling within the range of the previous system time window, and closing a data time window corresponding to the previous system time window, when a system time of the data statistical system reaches the closing time point.

In implementations, the apparatus 300 may further include a second output module 310 used for processing data to be processed that is stored before the synchronization time point and data times thereof are within the range of the current system time window, and outputting processing results thereof, when a system time of the data statistical system reaches the synchronization time point.

In implementations, the closing time point is set based on a time difference between the system time and the data time, and the synchronization time point is set based on time consumed for closing the time window and a difference between time clocks of devices in the data statistical system.

In implementations, the apparatus 300 may further include one or more processors 312, an input/output (I/O) interface 314, a network interface 316, and memory 318.

The memory 318 may include a form of computer readable media such as a volatile memory, a random access memory (RAM) and/or a non-volatile memory, for example, a read-only memory (ROM) or a flash RAM. The memory 318 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 318 may include program modules 320 and program data 322. The program modules 320 may include one or more of the modules as describe above.

Through the description of the above embodiments, one skilled in the art can clearly understand that the present disclosure can be implemented through hardware, and can also be implemented using software and a universal hardware platform. Based on this understanding, the technical solutions of the present disclosure can be manifested in a form of a software product. The software product can be stored in a non-volatile storage media (which may be CD-ROM, a flask drive, a movable drive, etc.), and includes instructions that cause a computing device (which may be a personal computer, a server, or a network device, etc.) to perform the methods described in various implementation scenarios of the present disclosure.

One skilled in the art can understand that the accompanying drawings are merely schematic diagrams of exemplary implementation scenarios. Modules or processes in the accompanying drawings may not be necessarily needed by the present disclosure.

One skilled in the art can understand that modules in apparatus(es) in an implementation scenario can be distributed among the apparatus(es) of the implementation scenario according to the description of the implementation scenario, or can also be changed correspondingly to be located in one or more apparatuses that are different from the instant implementation scenario. The modules in the above implementation scenarios can be combined as a single module, or can be further divided into a plurality of sub-modules.

The above sequence numbers of the present disclosure are merely used for description, and do not represent the qualities of the implementation scenarios.

A number of specific implementation scenarios of the present disclosure are described. However, the present disclosure is not limited thereto. Any changes that one skilled in the art can think of should also be covered by the scope of protection of the present disclosure.

The present disclosure may be further understood with clauses as follows.

Clause 1: A method comprising: determining respective system time windows corresponding to pieces of data to be processed based on respective data times of the pieces of data to be processed when the pieces of data to be processed are received in a current system time window; storing a first piece of data to be processed having a system receiving time earlier than a synchronization time point if a data time of the first piece of data to be processed is within a range of the current system time window; immediately processing a second piece of data to be processed having a system receiving time later than the synchronization time point if a data time of the second piece of data to be processed is within the range of the current system time window; immediately processing a third piece of data to be processed having a system receiving time earlier than a closing time point if a data time of the third piece of data to be processed is within a range of a previous system time window; and discarding a fourth piece of data to be processed having a system receiving time later than the closing time point if a data time of the fourth piece of data to be processed is within the range of the previous system time window.

Clause 2: The method of Clause 1, wherein each system time window is configured with a respective closing time point and a respective synchronization time point in advance, the respective closing time point is earlier than the respective synchronization time point, and is later than a respective starting time point of the respective system time window.

Clause 3: The method of Clause 1, wherein determining the respective system time windows corresponding to the pieces of data to be processed based on the respective data times of the pieces of the data to be processed comprises: obtaining a data time of a particular piece of data to be processed based on a timestamp of the particular piece of data to be processed in a data time window; determining whether the data time of the particular piece of data to be processed is later than a starting time point of the current system time window; determining that the particular piece of data to be processed falls within the range of the current system time window if affirmative; and determining that the particular piece of data to be processed falls within the range of the previous system time window if not.

Clause 4: The method of Clause 1, further comprising outputting processing results of one or more pieces of data to be processed with corresponding data times falling within the range of the previous system time window, and closing a data time window corresponding to the previous system time window, in response to a system time reaching the closing time point.

Clause 5: The method of Clause 1, further comprising: in response to a system time reaching the synchronization time point, processing one or more pieces of data to be processed that are stored before the synchronization time point and have corresponding data times falling within the range of the current system time window; and outputting processing results of the one or more pieces of data to be processed.

Clause 6: The method of Clause 1, wherein the closing time point a time of closing a data time window corresponding to the previous system time window.

Clause 7: The method of Clause 1, wherein the synchronization time point is an ending time of synchronization of a data time window corresponding to the current time window.

Clause 8: One or more computer readable media storing executable instructions that, when executed by one or more processors, cause the one or more processors to perform acts comprising: determining respective system time windows corresponding to pieces of data to be processed based on respective data times of the pieces of data to be processed when the pieces of data to be processed are received in a current system time window; if a data time of a first piece of data to be processed is within a range of the current system time window, storing a first piece of data to be processed if a system receiving time of the first piece of data to be processed is earlier than a synchronization time point, or immediately processing the first piece of data to be processed if the system receiving time of the first piece of data to be processed is later than the synchronization time point; and if a data time of a second piece of data to be processed is within a range of a previous system time window, immediately processing the second piece of data to be processed if a system receiving time of the second piece of data to be processed is earlier than a closing time point, or discarding the second piece of data to be processed if the system receiving time of the second piece of data to be processed is later than the closing time point.

Clause 9: The one or more computer readable media of Clause 8, wherein each system time window is configured with a respective closing time point and a respective synchronization time point in advance, the respective closing time point is earlier than the respective synchronization time point, and is later than a respective starting time point of the respective system time window.

Clause 10: The one or more computer readable media of Clause 8, wherein determining the respective system time windows corresponding to the pieces of data to be processed based on the respective data times of the pieces of the data to be processed comprises: obtaining a data time of a particular piece of data to be processed based on a timestamp of the particular piece of data to be processed in a data time window; determining whether the data time of the particular piece of data to be processed is later than a starting time point of the current system time window; determining that the particular piece of data to be processed falls within the range of the current system time window if affirmative; and determining that the particular piece of data to be processed falls within the range of the previous system time window if not.

Clause 11: The one or more computer readable media of Clause 8, the acts further comprising outputting processing results of one or more pieces of data to be processed with corresponding data times falling within the range of the previous system time window, and closing a data time window corresponding to the previous system time window, in response to a system time reaching the closing time point.

Clause 12: The one or more computer readable media of Clause 8, the acts further comprising: in response to a system time reaching the synchronization time point, processing one or more pieces of data to be processed that are stored before the synchronization time point and have corresponding data times falling within the range of the current system time window; and outputting processing results of the one or more pieces of data to be processed.

Clause 13: The one or more computer readable media of Clause 8, wherein the closing time point a time of closing a data time window corresponding to the previous system time window.

Clause 14: The one or more computer readable media of Clause 8, wherein the synchronization time point is an ending time of synchronization of a data time window corresponding to the current time window.

Clause 15: A data processing apparatus comprising: one or more processors; memory; a determination module stored in the memory and executable by the one or more processors to determine a system time window corresponding to data to be processed based on a data time of the data to be processed when the data to be processed is received in a current system time window; a first processing module used stored in the memory and executable by the one or more processors to store the data to be processed if a system receiving time is earlier than the synchronization time point, and immediately process the data to be processed if the system receiving time is later than the synchronization time point, if the data time is within a range of the current system time window; and a second processing module stored in the memory and executable by the one or more processors to immediately process the data to be processed if the system receiving time is earlier than the closing time point, and discard the data to be processed if the system receiving time is later than the closing time point, if the data time is within a range of a previous system time window.

Clause 16: The apparatus of Clause 15, wherein the apparatus is used in a data statistical system, each system time window is configured with a respective closing time point and a respective synchronization time point in advance, the respective closing time point is earlier than the respective synchronization time point, and is later than a respective starting time point of the respective system time window.

Clause 17: The apparatus of Clause 15, wherein the determination module is used for: obtaining the data time of the data to be processed based on a timestamp of the data to be processed in a data time window; determining whether the data time is later than a starting time point of the current system time window; determining that the data to be processed falls within the range of the current system time window if affirmative; and determining that the data to be processed falls within the range of the previous system time window if not.

Clause 18: The apparatus of Clause 15, further comprising a first output module used for outputting processing results of pieces of the data to be processed with respective data times falling within the range of the previous system time window, and closing a data time window corresponding to the previous system time window, when a system time of the data statistical system reaches the closing time point.

Clause 19: The apparatus of Clause 15, further comprising a second output module used for processing pieces of the data to be processed that are stored before the synchronization time point and corresponding data times are within the range of the current system time window, and outputting corresponding processing results, when a system time of the data statistical system reaches the synchronization time point.

Clause 20: The apparatus of Clause 15, wherein the closing time point is set based on a time difference between a system time and a data time, and the synchronization time point is set based on time consumed for closing a time window and a difference between time clocks of devices in the data statistical system.

What is claimed is:

1. A method comprising:
   determining respective system time windows corresponding to pieces of data to be processed based on respective data times of the pieces of data to be processed when the pieces of data to be processed are received in a current system time window;
   storing a first piece of data to be processed having a system receiving time earlier than a synchronization time point if a data time of the first piece of data to be processed is within a range of the current system time window;
   immediately processing a second piece of data to be processed having a system receiving time later than the synchronization time point if a data time of the second piece of data to be processed is within the range of the current system time window;
   immediately processing a third piece of data to be processed having a system receiving time earlier than a closing time point if a data time of the third piece of data to be processed is within a range of a previous system time window; and
   discarding a fourth piece of data to be processed having a system receiving time later than the closing time point if a data time of the fourth piece of data to be processed is within the range of the previous system time window.

2. The method of claim 1, wherein each system time window is configured with a respective closing time point and a respective synchronization time point in advance, the respective closing time point is earlier than the respective synchronization time point, and is later than a respective starting time point of the respective system time window.

3. The method of claim 1, wherein determining the respective system time windows corresponding to the pieces of data to be processed based on the respective data times of the pieces of the data to be processed comprises:
   obtaining a data time of a particular piece of data to be processed based on a timestamp of the particular piece of data to be processed in a data time window;
   determining whether the data time of the particular piece of data to be processed is later than a starting time point of the current system time window;
   determining that the particular piece of data to be processed falls within the range of the current system time window if affirmative; and
   determining that the particular piece of data to be processed falls within the range of the previous system time window if not.

4. The method of claim 1, further comprising outputting processing results of one or more pieces of data to be processed with corresponding data times falling within the range of the previous system time window, and closing a data time window corresponding to the previous system time window, in response to a system time reaching the closing time point.

5. The method of claim 1, further comprising:
   in response to a system time reaching the synchronization time point,
   processing one or more pieces of data to be processed that are stored before the synchronization time point and have corresponding data times falling within the range of the current system time window; and
   outputting processing results of the one or more pieces of data to be processed.

6. The method of claim 1, wherein the closing time point is a time of closing a data time window corresponding to the previous system time window.

7. The method of claim 1, wherein the synchronization time point is an ending time of synchronization of a data time window corresponding to the current system time window.

8. One or more computer readable media storing executable instructions that, when executed by one or more processors, cause the one or more processors to perform acts comprising:

determining respective system time windows corresponding to pieces of data to be processed based on respective data times of the pieces of data to be processed when the pieces of data to be processed are received in a current system time window;

if a data time of a first piece of data to be processed is within a range of the current system time window, storing a first piece of data to be processed if a system receiving time of the first piece of data to be processed is earlier than a synchronization time point, or immediately processing the first piece of data to be processed if the system receiving time of the first piece of data to be processed is later than the synchronization time point; and if a data time of a second piece of data to be processed is within a range of a previous system time window, immediately processing the second piece of data to be processed if a system receiving time of the second piece of data to be processed is earlier than a closing time point, or discarding the second piece of data to be processed if the system receiving time of the second piece of data to be processed is later than the closing time point.

9. The one or more computer readable media of claim 8, wherein each system time window is configured with a respective closing time point and a respective synchronization time point in advance, the respective closing time point is earlier than the respective synchronization time point, and is later than a respective starting time point of the respective system time window.

10. The one or more computer readable media of claim 8, wherein determining the respective system time windows corresponding to the pieces of data to be processed based on the respective data times of the pieces of the data to be processed comprises:

obtaining a data time of a particular piece of data to be processed based on a timestamp of the particular piece of data to be processed in a data time window;

determining whether the data time of the particular piece of data to be processed is later than a starting time point of the current system time window;

determining that the particular piece of data to be processed falls within the range of the current system time window if affirmative; and determining that the particular piece of data to be processed falls within the range of the previous system time window if not.

11. The one or more computer readable media of claim 8, the acts further comprising outputting processing results of one or more pieces of data to be processed with corresponding data times falling within the range of the previous system time window, and closing a data time window corresponding to the previous system time window, in response to a system time reaching the closing time point.

12. The one or more computer readable media of claim 8, the acts further comprising:

in response to a system time reaching the synchronization time point, processing one or more pieces of data to be processed that are stored before the synchronization time point and have corresponding data times falling within the range of the current system time window; and outputting processing results of the one or more pieces of data to be processed.

13. The one or more computer readable media of claim 8, wherein the closing time point is a time of closing a data time window corresponding to the previous system time window.

14. The one or more computer readable media of claim 8, wherein the synchronization time point is an ending time of synchronization of a data time window corresponding to the current system time window.

15. A data processing apparatus comprising:

one or more processors;

memory, coupled to the one or more processors, the memory storing thereon computer-readable instructions executable by the one or more processors, that when executed by the one or more processors, causes the one or more processors to perform acts including:

determining a system time window corresponding to data to be processed based on a data time of the data to be processed when the data to be processed is received in a current system time window;

storing the data to be processed if a system receiving time is earlier than a synchronization time point, and immediately processing the data to be processed if the system receiving time is later than the synchronization time point, if the data time is within a range of the current system time window; and immediately processing the data to be processed if the system receiving time is earlier than the closing time point, and discarding the data to be processed if the system receiving time is later than the closing time point, if the data time is within a range of a previous system time window.

16. The apparatus of claim 15, wherein the apparatus is used in a data statistical system, each system time window is configured with a respective closing time point and a respective synchronization time point in advance, the respective closing time point is earlier than the respective synchronization time point, and is later than a respective starting time point of the respective system time window.

17. The apparatus of claim 15, wherein determining the system time window corresponding to the data to be processed based on the data time of the data to be processed comprises:

obtaining the data time of the data to be processed based on a timestamp of the data to be processed in a data time window;

determining whether the data time is later than a starting time point of the current system time window;

determining that the data to be processed falls within the range of the current system time window if affirmative; and determining that the data to be processed falls within the range of the previous system time window if not.

18. The apparatus of claim 15, the acts further comprising outputting processing results of pieces of the data to be processed with respective data times falling within the range of the previous system time window, and closing a data time window corresponding to the previous system time window, when a system time of a data statistical system reaches the closing time point.

19. The apparatus of claim 15, further comprising processing pieces of the data to be processed that are stored before the synchronization time point and corresponding data times are within the range of the current system time window, and outputting corresponding processing results, when a system time of the data statistical system reaches the synchronization time point.

20. The apparatus of claim 15, wherein the closing time point is set based on a time difference between a system time and a data time, and the synchronization time point is set based on time consumed for closing a time window and a difference between time clocks of devices in a data statistical system.

* * * * *

UNITED STATES PATENT AND TRADEMARK OFFICE
CERTIFICATE OF CORRECTION

| | | |
|---|---|---|
| PATENT NO. | : 11,055,272 B2 | Page 1 of 1 |
| APPLICATION NO. | : 16/015100 | |
| DATED | : July 6, 2021 | |
| INVENTOR(S) | : Zhuoling Li et al. | |

It is certified that error appears in the above-identified patent and that said Letters Patent is hereby corrected as shown below:

On the Title Page

Item (30) change Priority application No. from "20150971758.4" to "201510971758.4."

Signed and Sealed this
Sixteenth Day of April, 2024

Katherine Kelly Vidal
*Director of the United States Patent and Trademark Office*